United States Patent [19]

Hinotani

[11] Patent Number: 4,878,214

[45] Date of Patent: Oct. 31, 1989

[54] OBJECTIVE LENS SUPPORTING DEVICE FOR OPTICAL PICKUP

[75] Inventor: Hiroaki Hinotani, Kakuda, Japan

[73] Assignee: Alps Electric Co., Ltd., Japan

[21] Appl. No.: 199,103

[22] Filed: May 26, 1988

[30] Foreign Application Priority Data

Sep. 8, 1987 [JP] Japan .......................... 62-138086[U]

[51] Int. Cl.⁴ .......................... G11B 7/08; G02B 7/02
[52] U.S. Cl. .................................. 369/256; 350/247; 350/255; 369/45
[58] Field of Search .............. 369/247, 252, 255, 256, 369/44, 45; 350/247, 255

[56] References Cited

U.S. PATENT DOCUMENTS

| | | | |
|---|---|---|---|
| 4,616,355 | 10/1986 | Kasahara | 369/45 |
| 4,646,283 | 2/1987 | Ito et al. | 369/256 |
| 4,766,583 | 8/1988 | Oinoue et al. | 369/45 |

*Primary Examiner*—Steven L. Stephan

*Attorney, Agent, or Firm*—Guy W. Shoup; Paul J. Winters

[57] ABSTRACT

An objective lens supporting device for an optical pickup including an objective lens opposed to an optical disc, a lens holder for holding the objective lens, a plurality of supporting rods formed of elastic material and arranged in parallel to each other, the lens holder being operatively supported by the supporting rods, and a driving mechanism for driving the lens holder in both a direction of an optical axis of the objective lens and a direction along an information recorded surface of the optical disc. A pair of neck portions is formed at both end portions of each supporting rod. Each neck portion has a section such that a geometrical moment of inertia with respect to a first axis intersecting a primary axis and extending in the direction of the optical axis of the objective lens is equal to a geometrical moment of inertia with respect to a second axis intersecting the primary axis and extending in the direction along the information recorded surface of the optical disc.

4 Claims, 4 Drawing Sheets

OBJECTIVE LENS SUPPORTING DEVICE FOR OPTICAL PICKUP

BACKGROUND OF THE INVENTION

The present invention relates to an objective lens supporting device for an optical pickup for use with an optical disc player such as a compact disc player and a video disc player, and more particularly to an objective lens supporting device for an optical pickup including a lens holder operatively supported by supporting rods formed of elastic material in such a manner as to be driven in a focussing direction and a tracking direction.

FIG. 7 is a perspective view of a conventional objective lens supporting device for the optical pickup which device is similar to that disclosed in Japanese Utility Model Application No. 62-000787, and FIG. 8 is a cross section taken along the line VII—VII in FIG. 7.

Referring to FIG. 7, reference numeral 1 designates an objective lens opposed to an optical disc (not shown). The objective lens 1 is held by a lens holder 2. The lens holder 2 is finely movably supported by four supporting rods 3 to a fixed member 4. Each supporting rod 3 is formed of elastic material such as rubber and elastomer.

A focussing coil 6 is wound around a rectangular outer periphery of the lens holder 2, and tracking coils 7 are fixed to an outer periphery of the focussing coil 6. A pair of magnets 9 retained by yokes 8 are located outside the tracking coils 7 in such a manner as to be opposed to the focussing coil 6 and the tracking coils 7.

In the conventional objective lens supporting device for the optical pickup as mentioned above, the lens holder 2 is driven by the current flowing in the focussing coil 6 and the magnetism of the magnets 9 to thereby deform the supporting rods 3 and effect the focussing correction in a direction (Y-direction) of an optical axis of the objective lens 1. In such a focussing correcting operation, a detecting beam to be irradiated from the objective lens 1 onto an information recorded surface of the optical disc is corrected to be always focussed on the recorded surface. Further, the lens holder 2 is driven by the current flowing in both side portions of the tracking coils 7 and the magnetism of the magnets 9 to thereby deform the supporting rods 3 and effect the tracking correction in a direction (X-direction) along the information recorded surface of the optical disc. In such a tracking correcting operation, a spot of the detecting beam to be irradiated from the objective lens 1 onto the information recorded surface of the optical disc is corrected to precisely scan an information track of the recorded surface.

Generally, in such an objective lens supporting device for the optical pickup as mentioned above wherein the lens holder 2 is driven to elastically deform the supporting rods 3 and effect the correcting operation, the X-direction and Y-direction oscillation characteristics of an oscillating system consisting of the objective lens 1, the lens holder 2 and the supporting rods 3 have a large influence on the tracking correcting operation and the focussing correcting operation. In other words, this type lens supporting device is required to have the elastic characteristics of the supporting rods 3 upon deformation in the X-direction substantially identical with those in the Y-direction. To this end, it is desirable to make the spring constant of the supporting rods upon deformation in the X-direction identical with that in the Y-direction. If the spring constant in the X-direction differs from that in the Y-direction, and the elastic characteristics in the X-direction therefore differ from those in the Y-direction, the lens holder 2 tends to be operated in the direction where the spring constant of the supporting rods 3 is smaller, causing a problem of auxiliary resonance.

In manufacturing the supporting rods 3 to have a uniform sectional area in the longitudinal direction as shown in FIG. 7, there is a possibility of torsion and strain generating upon injection molding, for example, of the supporting rods 3. In the injection molding, there is a possibility that unevenness is formed on the surface of the rods 3 by the depression of a knockout pin when the supporting rods 3 are removed from a metal mold. As a result, even in forming the supporting rods 3 each having a square section, the shape of the section is rendered ununiform due to strain as shown in FIG. 8. Further, the direction of the section in each sectional position along the longitudinal direction is varied by the torsion of the supporting rod. As a result, a geometrical moment of inertia Ix with respect to a reference axis X intersecting a primary axis O differs from a geometrical moment of inertially with respect to a reference axis Y intersecting the primary axis O in each section, thus causing a difference in the spring constant of the supporting rod 3 between in the tracking direction (X-direction) and the focussing direction (Y-direction). As a result, the elastic characteristics, namely, the oscillation characteristics in the X-direction and the Y-direction are not balanced to cause the auxiliary resonance in the correcting operation.

SUMMARY OF THE INVENTION

Accordingly, it is an object of the present invention to provide an objective lens supporting device for an optical pickup wherein the spring constant of the supporting rod in the X-direction is identical with that in the Y-direction so as to make the oscillation characteristics in the focussing direction substantially the same as those in the tracking direction and thereby to prevent the auxiliary resonance in the correcting operation.

According to the present invention, there is provided in an objective lens supporting device for an optical pickup including an objective lens opposed to an optical disc, a lens holder for holding the objective lens, a plurality of supporting rods formed of elastic material and arranged in parallel to each other, said lens holder being operatively supported by the supporting rods, and a driving mechanism for driving the lens holder in both a direction of an optical axis of the objective lsns and a direction along an information recorded surface of the optical disc; the improvement comprising a pair of neck portions formed at both end portions of each supporting rod, said each neck portion having a section such that a geometrical moment of inertia with respect to a first axis intersecting a primary axis and extending in the direction of the optical axis of the objective lens is equal to a geometrical moment of inertia with respect to a second axis intersecting the primary axis and extending in the direction along the information recorded surface of the optical disc.

In the objective lens supporting device for the optical pickup according to the present invention, the neck portions are formed at both end portions of the supporting rod. Accordingly, the geometrical moment of inertia at the neck portions is rendered smaller than that at the other thick portion. That is, the spring constant of the neck portions is smaller than that of the other portion. As a result, the neck portions are easy to deform in the correcting operation of the lens holder. Furthermore, the geometrical moment of inertia with respect to the axis intersecting the primary axis and extending in the focussing direction is identical with the geometrical moment of inertia with respect to the axis intersecting the primary axis and extending in the tracking direction. As a result, the spring constant in the focussing direction is rendered identical with that in the Y-direction, thereby well balancing the focussing correcting operation and the tracking correcting operation. Especially, when the section of the neck portions is square, and each neck portion is positioned in such a manner that a pair of opposed sides of the square are directed to the focussing direction and another pair of opposed sides are directed to the tracking direction, the neck portions are easy to deform in the focussing direction and the tracking direction, but they are hard to deform in other directions. Thus, the correcting operation is stabilized.

Other objects and features of the invention will be more fully understood from the following detailed description and appended claims when taken with the accompanying drawings.

DETAILED DESCRIPTION OF THE PREFERRED EMBODIMENTS

Figure 1:
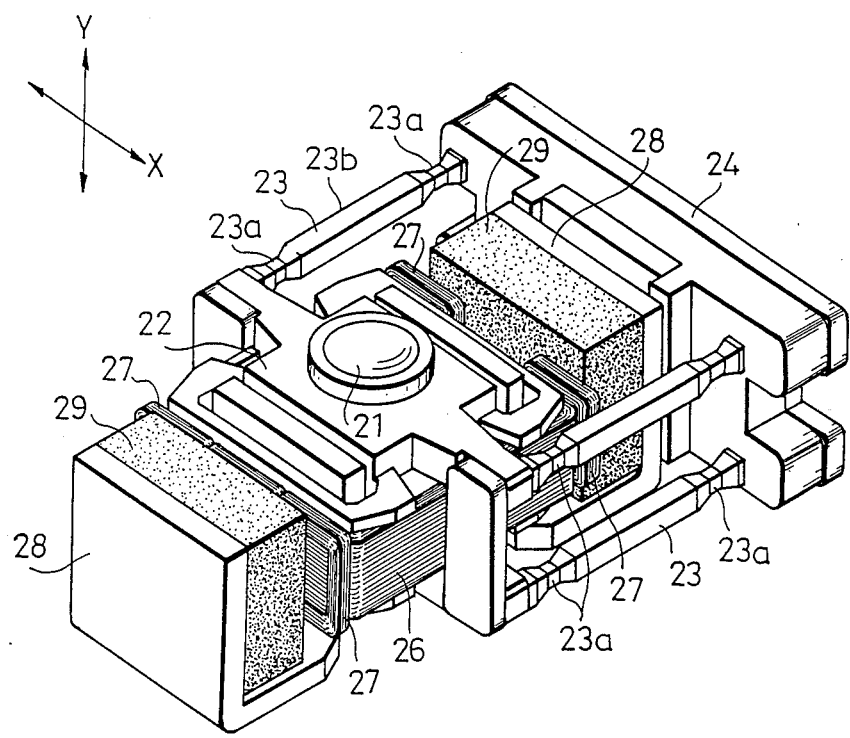
FIG. 1 is a perspective view of the objective lens supporting device for the optical pickup in a preferred embodiment of the present invention.
Figure 2:
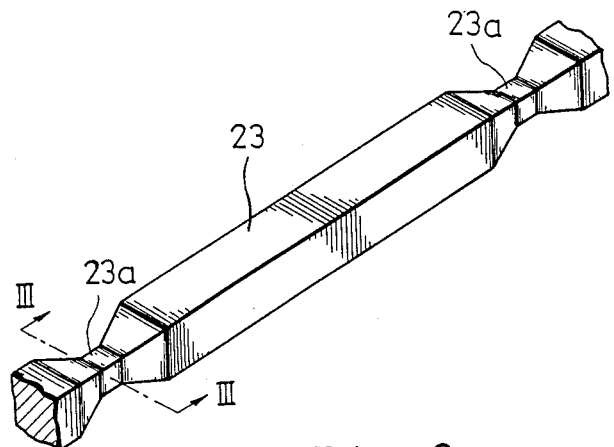
FIG. 2 is an enlarged perspective view of the supporting rod mounted in the objective lens supporting device shown in FIG. 1.
Figure 3:
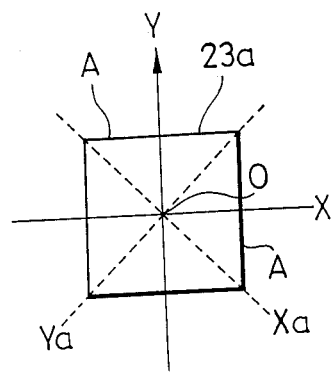
FIG. 3 is a cross section taken along the line III—III in FIG. 2.

Referring now to FIG. 1 which shows a first preferred embodiment of the present invention, an objective lens 21 is held by a lens holder 22. The lens holder 22 is finely movably supported by four supporting rods 23 to a fixed member 24. Each supporting rod 23 is formed of elastic material such as rubber and elastomer. The supporting rod 23 is formed at its both end portions with a pair of neck portions 23a. As shown in FIGS. 2 and 3, each neck portion 23a has a square section, and the other portion of the supporting rod 23 except the neck portions 23a also has a square section, but has a sectional area sufficiently larger than that of the neck portions 23a. The neck portions 23a having a square section are positioned in such a manner that a pair of opposed sides A of the square are directed to the tracking direction (X-direction) and another pair of opposed sides A' are directed to the focussing direction (Y-direction). In forming the neck portions 23a at both end portions of the supporting rod 23, there is less generated strain and torsion at the neck portions 23a as compared with the other thick portion, and the neck portions 23a may be formed without the influence of the knockout pin. As a result, it is possible to make the section of the neck portions 23a precisely square. Accordingly, in the square section of the neck portions 23a, a geometrical moment of inertia Ix with respect to a reference axis intersecting a primary axis O and extending in the X-direction is equal to a geometrical moment of inertia Iy with respect to a reference axis intersecting the primary axis O and extending in the Y-direction. Accordingly, a spring constant of the neck portions 23a upon deformation in the X-direction is equal to that upon deformation in the Y-direction, thereby balancing the operations of the lens holder 22 in the X-direction and the Y-direction. Further, since the section of the neck portions 23a is square, a geometrical moment of inertia with respect to an axis Xa shown in FIG. 3 is greater than that with respect to the reference axis extending in the X-direction mentioned above. Similarly, a geometrical moment of inertia with respect to an axis Ya shown in FIG. 3 is greater than that with respect to the reference axis extending in the Y-direction. Therefore, the neck portions 23a are easy to deform in the X-direction and the Y-direction, but they are hard to deform in the Xa-direction and the Ya-direction.

A focussing coil 26 is wound around a rectangular outer periphery of the lens holder 22, and tracking coils 27 are fixed to an outer periphery of the focussing coil 26. A pair of magnets 29 retained by yokes 28 are located outside the tracking coils 27 in such a manner as to be opposed to the focussing coil 26 and the tracking coils 27.

In operation, the lens holder 22 is driven by the current flowing in the focussing coil 26 and the magnetism of the magnets 29, so as to effect the focussing correction in the Y-direction. In such a focussing correcting operation, a detecting beam to be irradiated from the objective lens 21 onto the information recorded surface of the optical disc is corrected to be always focussed on the recorded surface. Further, the lens holder 22 is driven by the current vertically flowing in both side portions of the tracking coils 27 and the magnetism of the magnets 29 so as to effect the tracking correction in the X-direction. In such a tracking correcting operation, a spot of the detecting beam to be irradiated from the objective lens 21 onto the information recorded surface of the optical disc is corrected to precisely scan the information track of the recorded surface.

As previously mentioned, the sectional area of the neck portions 23a of each supporting rod 23 is sufficiently smaller than that of the other portion. Therefore, the deformation of the neck portions 23a primarily contributes to the correcting operations of the lens holder 22 in the X-direction and the Y-direction, and the elastic deformation characteristics of the supporting rods 23 as well as the oscillation characteristics of the oscillating system are dependent upon the deformation of the neck portions 23a. As previously mentioned, each neck portion 23a has a precisely square section, and the geometrical moments of inertia in the X-direction and the Y-direction are equal to each other. As a result, the spring constants upon deformation in the X-direction and the Y-direction become equal to each other. Accordingly, the correcting operations in the tracking direction and the focussing direction are well balanced. Further, since a pair of opposed sides A of the square section of the neck portions 23a are directed to the X-direction, and another pair of opposed sides A' are directed to the Y-direction as shown in FIG. 3, the neck portions 23a are hard to deform in the Xa-direction and the Ya-direction. As a result, there is hardly generated the auxiliary resonance due to deformation of the neck portions 23a in any directions other than the X-direction and the Y-direction, thus effecting a stable correcting operation.

Figure 6:
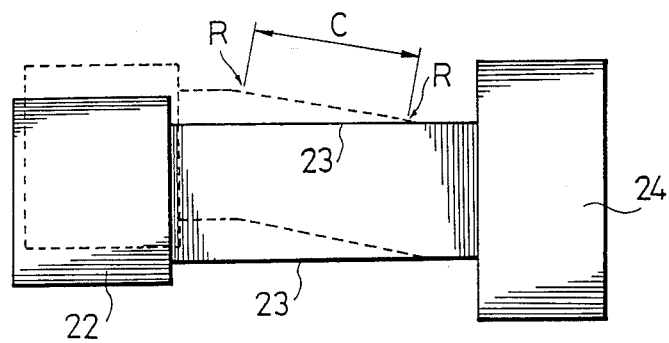
FIG. 6 is a schematic illustration of the deformed condition of the supporting rod.
Figure 7:
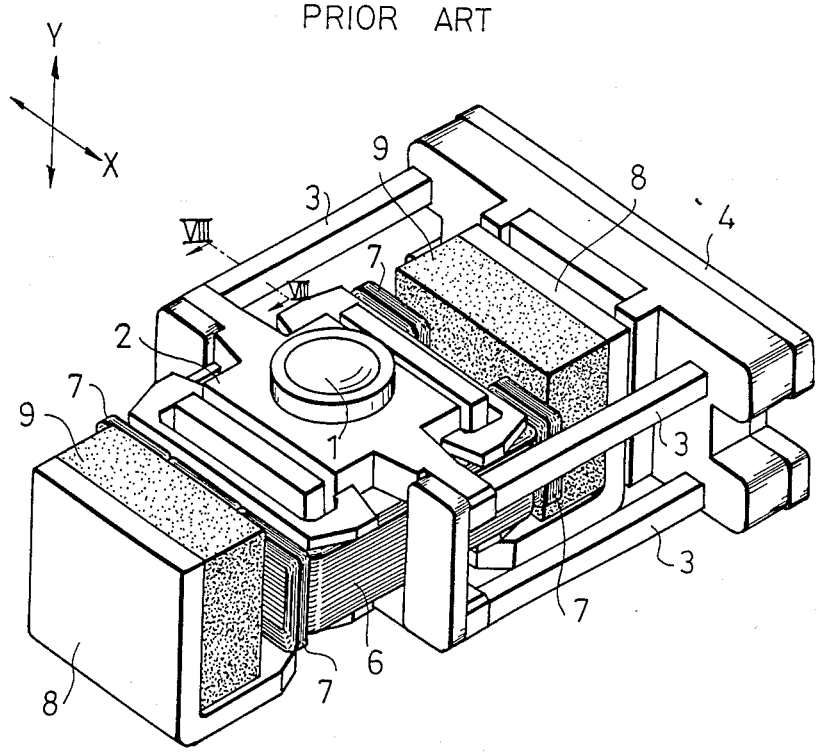
FIG. 7 is a perspective view of the conventional objective lens supporting device for the optical pickup.
Figure 8:
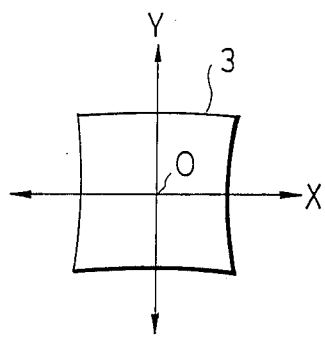
FIG. 8 is a cross section taken along the line VIII—VIII in FIG. 7.

Referring to FIG. 6, when the lens holder 22 is supported by the parallel supporting rods 23 (inclusive of a structure such that the section of each supporting rod 23 is uniform without the neck portions 23a), an amount of deformation of the supporting rod 23 is large at both end portions R, and it is almost zero at a central portion C, namely, it is maintained under a substantially linear condition. Accordingly, by locating the neck portions 23a at the both end portions R where the supporting rods 23 are easy to deform, the neck portions 23a may be made primarily contribute to the deformation of the supporting rod 23 in the correcting operation of the lens holder 22. Furthermore, by forming the neck portions 23a in a precisely square shape as mentioned above, the correcting operations in the X-direction and the Y-direction may be well balanced even if the section of the other thick portion of the supporting rod 23 is not uniform.

Figure 4:
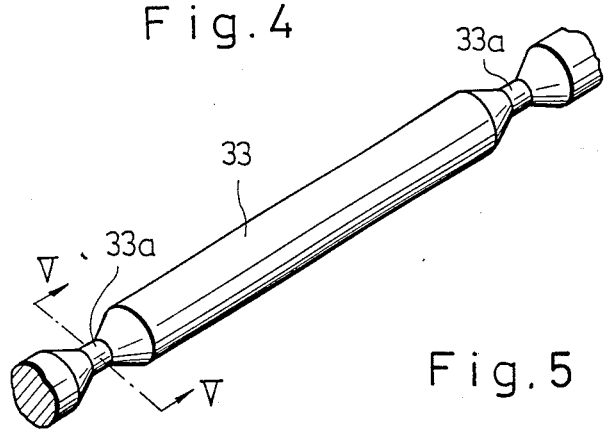
FIG. 4 is an enlarged perspective view of a modified embodiment of the supporting rod.
Figure 5:
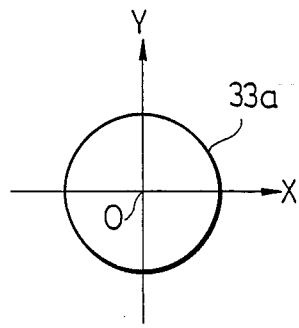
FIG. 5 is a cross section taken along the line V—V in FIG. 4.

Although the shape of the supporting rod 23 is of a quadrangular prism in the above preferred embodiment, it may be of a circular cylinder as shown by reference numeral 33 in FIG. 4. In the modified embodiment, each supporting rod 33 is formed with a pair of neck portions 33a in the same manner as of the previous embodiment, and as shown in FIG. 5, the section of each neck portion 33a is of a precisely regular circle. Accordingly, the geometrical moment of inertia Iy with respect to the Y-axis intersecting the primary axis O may be made equal to the geometrical moment of inertia Ix with respect to the X-axis intersecting the primary axis O.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an objective lens supporting device for an optical pickup including an objective lens opposed to an optical disc, a lens holder for holding said objective lens, a plurality of supporting rods formed of elastic material and arranged in parallel to each other, said lens holder being operatively supported by said supporting rods, and a driving mechanism for driving said lens holder in both a direction of an optical axis of said objective lens and a direction along an information recorded surface of said optical disc; the improvement comprising a pair of neck portions formed at both end portions of said each supporting rod, said each neck portion having a section such that a geometrical moment of inertia with respect to a first axis intersecting a primary axis and extending in said direction of said optical axis of said objective lens is equal to a geometrical moment of inertia with respect to a second axis intersecting said primary axis and extending in said direction along said information recorded surface of said optical disc.

2. The objective lens supporting device for the optical pickup as defined in claim 1, wherein said section of said each neck portion is of a square.

3. The objective lens supporting device for the optical pickup as defined in claim 2, wherein said each neck portion is positioned in such a manner that a pair of opposed sides of said square are directed to said first axis and another pair of opposed sides are directed to said second axis.

4. The objective lens supporting device for the optical pickup as defined in claim 1, wherein said section of said each neck portion is of a regular cicle.

* * * * *